United States Patent [19]

de La Chapelle et al.

[11] Patent Number: 5,019,826

[45] Date of Patent: May 28, 1991

[54] COHERENT RADAR USING RECIRCULATING DELAY LINE

[75] Inventors: Michael de La Chapelle, Bellevue, Wash.; Richard E. Bryan, Canoga Park; Clark D. Brenneise, Reseda, both of Calif.

[73] Assignee: Hughes Aircraft Company, Los Angeles, Calif.

[21] Appl. No.: 250,675

[22] Filed: Sep. 29, 1988

[51] Int. Cl.$^5$ ............................................. G01S 7/288
[52] U.S. Cl. .................................... 342/202; 342/204
[58] Field of Search ................. 342/202, 203, 15, 172, 342/204, 195, 175, 14

[56] References Cited

U.S. PATENT DOCUMENTS

| | | | |
|---|---|---|---|
| 3,218,561 | 11/1965 | Moeller | 331/172 X |
| 3,879,661 | 4/1975 | Collins | 342/192 X |
| 3,968,490 | 7/1976 | Gostin | 342/93 |
| 3,971,021 | 7/1976 | Cann | 342/15 |
| 3,991,417 | 11/1976 | Levine | 342/160 |
| 4,089,001 | 5/1978 | Donahue | 342/160 |
| 4,145,691 | 3/1979 | Freeling et al. | 342/15 |
| 4,164,741 | 8/1979 | Schmidt | 342/15 |
| 4,166,212 | 8/1979 | Judeinstein | 370/4 |
| 4,227,194 | 10/1980 | Herman et al. | 342/25 |
| 4,322,730 | 3/1982 | Chrzanowski | 342/15 |
| 4,439,767 | 3/1984 | Hefley et al. | 342/15 |
| 4,591,856 | 5/1986 | Masak | 342/203 |
| 4,683,473 | 7/1987 | Haugland | 342/172 |
| 4,808,999 | 2/1989 | Toman | 342/15 |
| 4,816,832 | 3/1989 | Gold et al. | 342/14 |
| 4,903,029 | 2/1990 | Newberg et al. | 342/172 |

Primary Examiner—John B. Sotomayor
Attorney, Agent, or Firm—R. M. Heald; C. D. Brown; W. K. Denson-Low

[57] ABSTRACT

A portion of a radar transmit pulse is inserted into a recirculating delay line having a one cycle delay equal to the duration of a transmit pulse. A pulse train coupled from the recirculating delay serves as a local oscillator for the radar receiver. The delay medium may be an optical fiber, a coaxial transmission line or a surface acoustic wave (SAW) device.

8 Claims, 4 Drawing Sheets

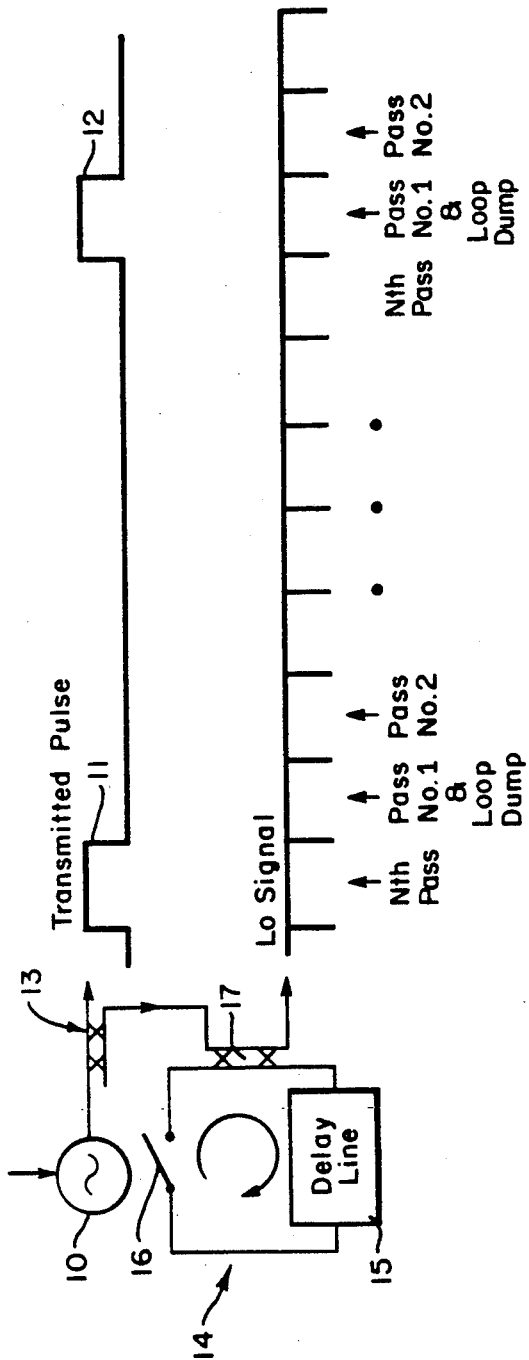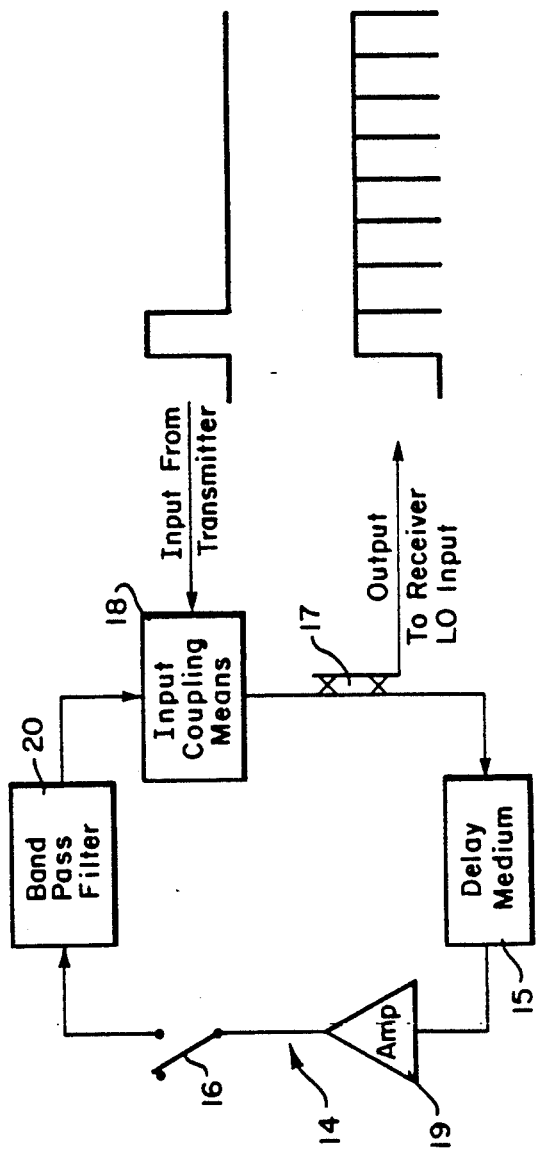
FIG. 1
FIG. 2

COHERENT RADAR USING RECIRCULATING DELAY LINE

BACKGROUND OF THE INVENTION

1. Field of the Invention

The present invention relates to a radar system, and, more particularly, to a coherent radar system utilizing a delay line in order to serve as system local oscillator and produce pulse-to-pulse coherency.

2. Description of Related Art

A radar system in its primary major elements may include a radio frequency oscillator which is controlled by a pulse modulator, or pulser, so as to produce periodic pulses of high power but of relatively short duration. These pulses are applied to a highly directional antenna, typically adapted for rotation, and the antenna is controlled to transmit the pulses toward a target or towards a region in which a target is sought. A receiver, which may be interconnected with the same antenna as the transmitter, is controlled by a switching arrangement ("duplexer") to interconnect the antenna to the receiver during the inerval between transmitted power pulses in order to receive reflected energy from a target. By monitoring the antenna direction and timing of reflected pulse returns, location and range of a target can be obtained.

There are other radar systems for detecting targets and their ranges which rely upon the radiation of unmodulated continuous wave energy. The present invention is not concerned with these continuous wave or "CW" radar systems, but rather with pulse type systems.

One of the earliest forms of oscillators for producing radar pulses was a device called a magnetron, which has an undesirable charateristic in that the phase of each transmitted pulse is randomly related to the phase of previous pulses. The phase problem requires special adjustment and control when the radar is being used as a moving target indicator (MTI). That is, a primary use of radar, for either domestic or military applications, is to detect a moving target amid echoes obtained from adjacent fixed objects, the latter frequently being referred to as "ground clutter" or just "clutter".

More particularly, it is necessary for a radar to act as a satisfactory MTI that the phase of a transmitted pulse be made coherent with the system local oscillator (LO), and it is this coherence that we are primarily concerned with here and in connection with which the described invention achieves its primary utility and advantages.

Modern MTI radars usually achieve coherency by using a very stable master oscillator. This master oscillator is very expensive, especially for missile radar that are produced in large volume. Conventional coherent radar systems using stable oscillators have not been considered affordable for this class of weapons, and it is, therefore, highly desirable to find reduced cost alternatives.

In the case of air-to-air missile seekers, they usually use medium PRF or high PRF, both of which are ambiguous in range necessitating maintaining pulse-to-pulse coherence. The present invention can achieve pulse-to-pulse coherence by locking the phase of each transmitted pulse to the delayed replica of the previously transmitted pulse.

The early radar systems, generally operating at lower frequencies than used now, achieved coherency between the LO and the transmit pulse by locking the LO to the transmit phase and maintaining the locked phase during the listen interval. This technique, however, did not provide pulse-to-pulse coherence.

At the present time, fully satisfactory coherent radar seekers having pulse-to-pulse coherence require a relatively expensive frequency reference unit (FRU) that consists of stable oscillators which operate over wide temperature ranges. This necessity for an FRU is considered to make some missile radar seeker systems prohibitively expensive.

It has been suggested for shipboard use to detect low flying targets over the sea surface that a high resolution radar be provided with a noncoherent delay line canceller, the delay line being of the fiber optic variety. C. T. Chang, D. E. Altman, D. R. Wehner, D. J. Albares, "Noncoherent Radar Moving Target Indicator Using Fiber Optic Delay Lines," IEEE Trans. on Circuits and Systems, Vol. CAS-26, No. 12, Dec. 1979, pp. 1132–1135.

SUMMARY OF THE INVENTION

It is a primary aim and object of the present invention to provide an improved coherent-on-receive (COR) radar system utilizing a delay line which serves as a local oscillator for the system.

Another object is the provision of a coherent radar system as in the previous object that eliminates the need for a frequency reference unit.

A still further object is the provision of a coherent radar system in which pulse-to-pulse coherency is obtained by locking each transmit pulse to the previous pulse delayed in time by a RF delay line.

Yet another object is the provision of a coherent radar system as in the previous objects in which the delay line is a fiber optic delay line.

In accordance with a first embodiment of this invention, a coherent-on-receive radar system is provided having an optical delay line including a fiber-optic transmitter which converts a microwave radar signal into an optical signal, an optical fiber of predetermined length for carrying and delaying the optical signal, and a fiber-optic receiver for converting the optical signal once again into a microwave signal. A microwave switch or directional coupler couples a part of the transmitted signal during a transmitted radar pulse into the fiber-optic delay line. At the end of the radar pulse, the microwave switch is transferred to another connective mode forming a closed loop to cause recirculation of the stored signal. In addition, part of the recirculating signal is continuously coupled off the delay line to serve as the radar local oscillator (LO). Each cycle in the delay line loop, the microwave signal is converted into an RF modulated optical signal which is delayed in accordance with the physical characteristics of the fiber loop, the optical signal is converted back to microwave form, amplified, and the sequence is repeated. The amplification for the delay line recovers signal loss incurred by the signal transmission through the delay line.

The optical fiber of the delay line is cut to a predetermined length so as to delay a pulse making one passage around the delay line by an amount precisely equal to the duration of a radar transmitted pulse. In this manner, repeated replicas of the radar transmitted pulse are continuously coupled off, amplified and mixed with the radar echoes or received signals. At the end of the listen interval, the microwave switches return to the orginal connective mode directing the recirculated pulse to the radar transmitter for injection locking of a new pulse. As before, a part of the new pulse is coupled into the delay line and the operation continues as already described.

An alternate form of the invention uses an all requirement of the first embodiment of converting the delayed transmit pulse from a microwave signal to an optical signal and then once again back to a microwave signal, each time the pulse circulates around the delay line loop. Specifically, this eliminates conversion noise buildup associated with the microwave and optoelectronic components inside the delay loop.

BRIEF DESCRIPTION OF THE DRAWINGS

In the accompanying drawings:

FIG. 1 is a schematic representation of the radar system of this invention using a recirculated pulse in a delay line as system local oscillator (LO).

FIG. 2 is a function block circuit schematic of a first embodiment of this invention for producing a system LO.

DESCRIPTION OF THE PREFERRED EMBODIMENTS

Figure 3:
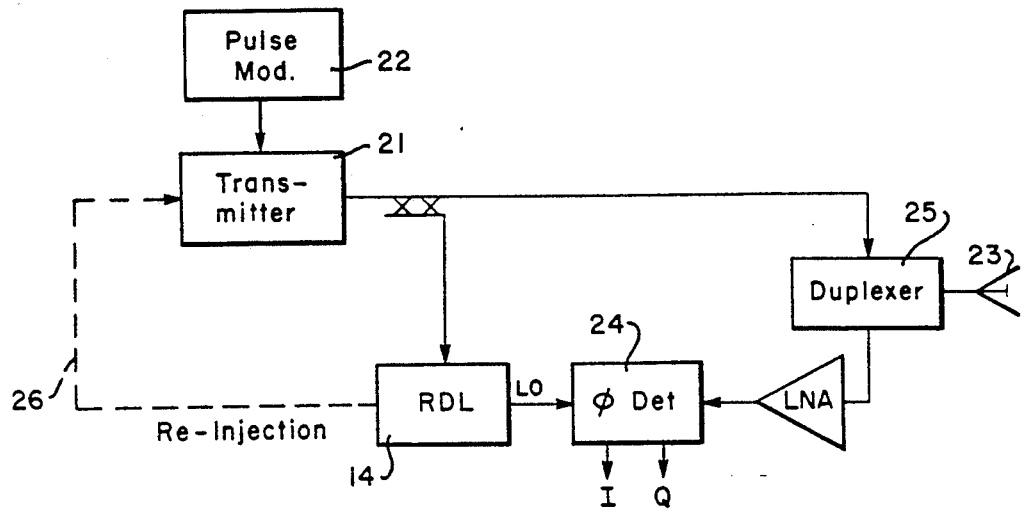
FIG. 3 depicts in block form a homodyne radar system with a recirculating delay incorporated therein.

For the ensuing description of preferred embodiments of this invention, reference is now made to the drawings and particularly to FIG. 1 thereof. Since the general operation of a radar system is well-known in the art, a detailed description of the more generalized aspects of a radar system will not be given. In a way wellknown in the radar art, a high-frequency oscillator 10 is modulated (arrow) to provide a series of transmit pulses 11 and 12 of predetermined constant duration. A portion of, say, the transmit pulse 11 is coupled at 13 into a recirculating delay line 14 including a delay medium or line 15 which is selectively arranged into a closed loop by closing a switch 16. More particularly, on closing the switch the signal is "stored" and circulates in the delay line closed loop. The loop delay is set to precisely equal the transmit pulse duration, i.e., the closed loop is "filled" when the trailing edge of the transmit is reached. The stored signal circulates around the closed loop and is coupled off at directional coupler 17 to provide the system local oscillator (LO). With the loop delay equaling the transmit pulse duration, then a continuous LO signal is obtained. On arrival of the next transmit pulse 12, the switch is opened allowing the new pulse to be stored and the previously stored pulse 11 to be dumped.

FIG. 2 shows that a portion of the transmit pulse is inserted into the recirculating delay line 14 via a suitable coupling means 18 (e.g., switch or directional coupler). The delay medium or delay line 15 can optionally be a coaxial delay line, SAW delay, or fiber-optic delay line.

Also, optionally an amplifier/limiter 19 and band pass filter 20 can be incorporated into the recirculating delay line 14 for recovering losses and limiting noise buildup, respectively. Coupling of the delayed recirculated pulses to the radar receiver is accomplished via directional coupler 17.

FIG. 3 depicts the incorporation of the recirculating delay line 14 (RDL) in a homodyne radar system. Thus, the output of radar transmitter 21 is modulated by pulse modulator 22 to provide a pulse output which in conventional manner uses the same antenna 23 for both the transmitter 21 and phase detector 24 through the action of duplexer 25. As described, the RDL produces the LO signal for receiver use. Also, as will be more particularly described the pulses in the RDL can be re-injected along line 26 into the transmitter to achieve pulse to pulse coherency.

Figure 4:
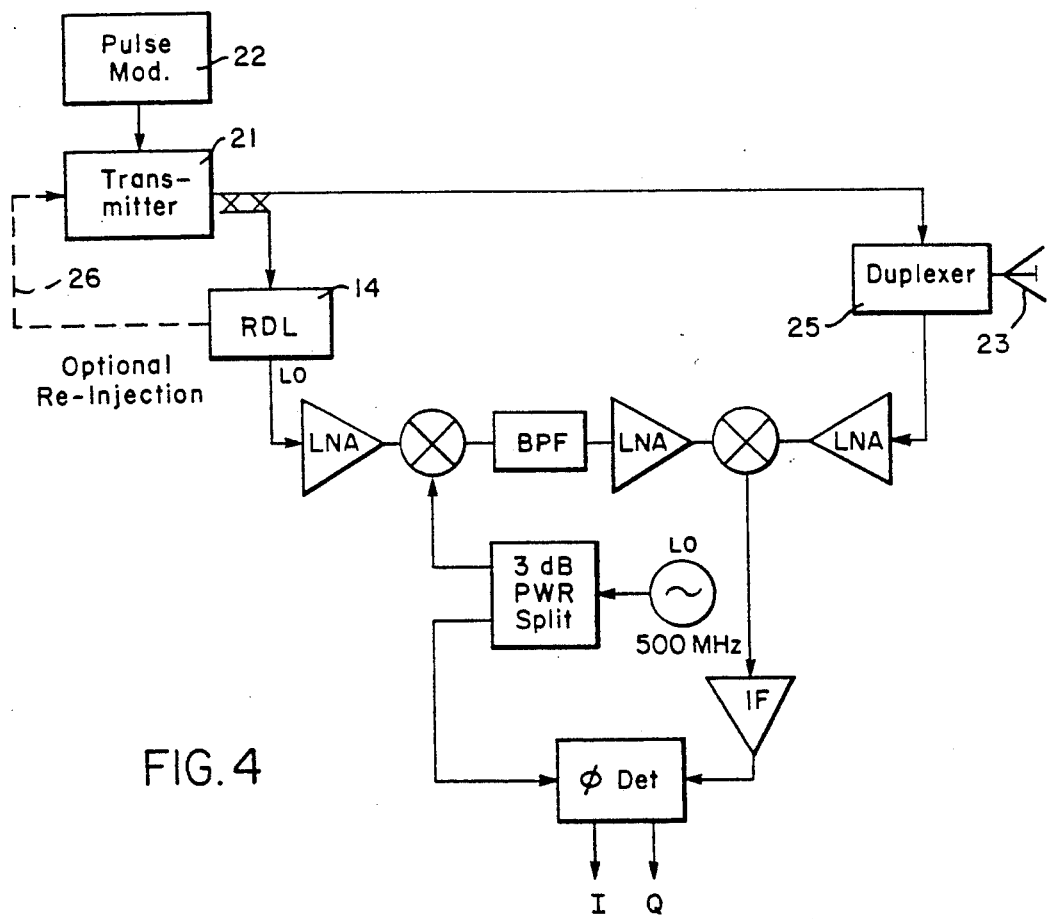
FIG. 4 shows a recirculating delay line incorporated into a heterodyne radar system in accordance with the present invention.
Figure 8:
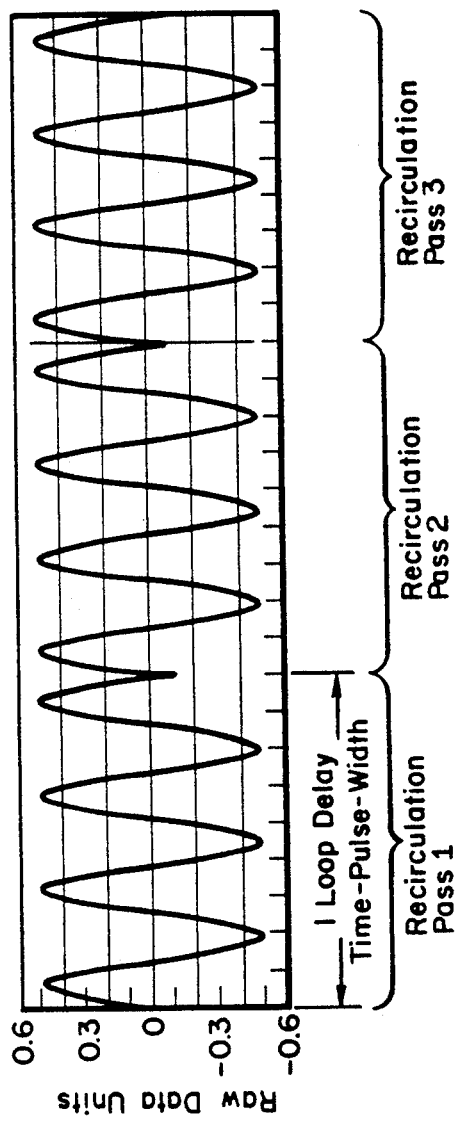
FIG. 8 is a graph of the LO signal produced by the recirculating delay line of the invention.

FIG. 4 shows the incorporation of the RDL 14 of FIG. 3 into a heterodyne radar system.

Figure 5:
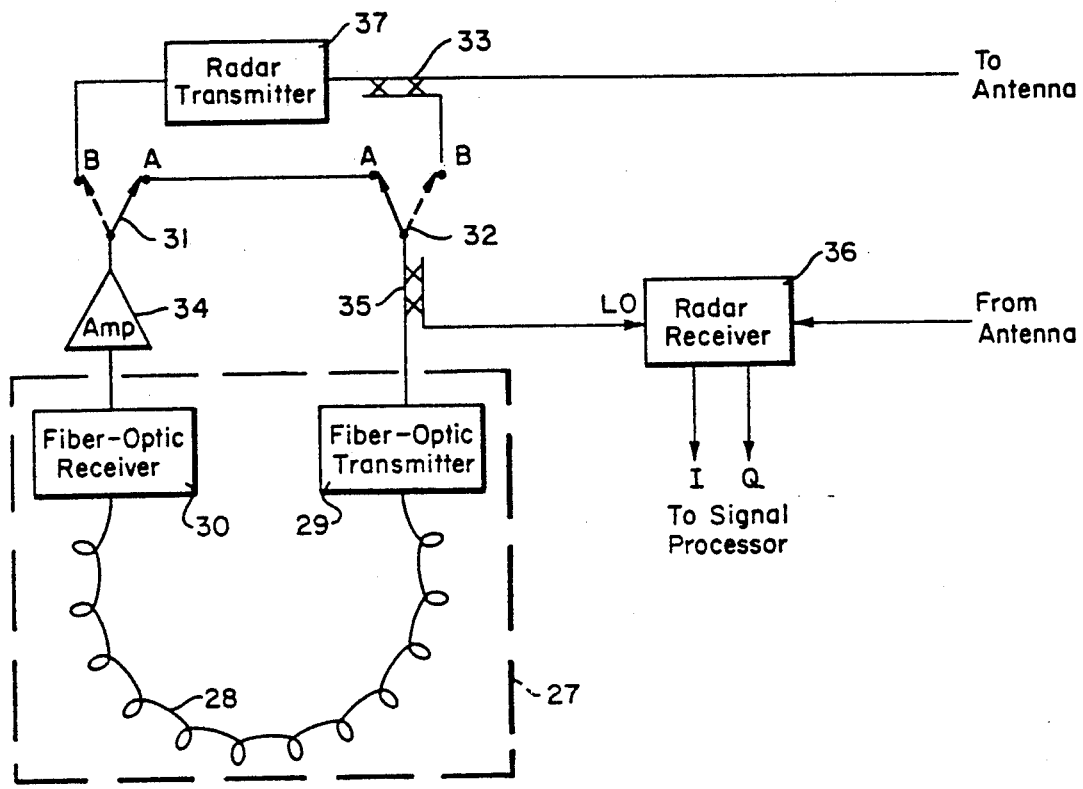
FIG. 5 is a circuit schematic of a coherent-on-receive radar system according to this invention which also serves as system local oscillator.

FIG. 5 depicts in somewhat more detail a schematic block diagram of a coherent-on-receive radar system of the present invention in which radar pulses are maintained in a prescribed phase relationship with stored signals from the LO. An optical delay line 27 is provided having as its general purpose to delay received or echo pulses from a target, the delayed pulses are then subsequently mixed with other pulses to achieve increased noise cancellation which is a desirable and advantageous aspect of the invention. The delay line includes a prescribed length of optical fiber 28 cut to a length for delaying a signal pulse making one full traversal of the delay line a predetermined amount of time, which will be discussed in some detail later.

A fiber-optic transmitter 29 converts a microwave signal, namely, a radar pulse, into a corresponding microwave modulated optical signal which is injected into the optical fiber 28. A complementary set of apparatus is a fiber-optic receiver and limiter 30 interconnected with the opposite end of the delay line fiber 28 and which converts optical signals traversing the delay line into a corresponding microwave signal pulse.

First and second microwave switches 31 and 32 interconnect with the respective ends of the delay line and have two connective aspects identified as A and B, which, in a way well known in the electrical art, are simultaneously switched to either A or B. More particularly, during the transmission of radar pulse, the microwave switches are both located in position B at which time microwave energy is coupled via a microwave directional coupler 33 and through the microwave switch 32 to the fiber-optic transmitter 29 where a corresponding optical pulse is generated and inserted into the delay line fiber 28. At the end of the transmitted pulse, the microwave switches are switched to connective aspect A which forms a closed loop in the delay line allowing the transmitted signal inserted into the line to recirculate. For each cycle or recirculation around the closed loop, the microwave pulse is converted into an optical signal, the optical signal is delayed in the optical fiber, the optical signal is converted back to a microwave signal in the fiber optic receiver which is amplified, and the cycle is repeated. The amplifier 34 in the recirculation loop recovers signal loss which is incurred in the fiber optic delay line. The amplifier may limit the recirculating signal to suppress noise buildup.

The optical fiber 28 of the delay line is cut to provide a length for delaying the circulating pulse an amount precisely equal to the duration of the transmitted radar pulse. In this manner, repeated replicas of the transmitted signal are continuously coupled off by the microwave directional coupler 35 and amplified at 36 prior to mixing with the radar signals, as will be more particularly described. That is, part of the recirculating signal is continuously coupled off and can serve as the local oscillator for the radar system. At the termination of the listen interval, the switches 31 and 32 once again return to position B directing the recirculating pulse to the transmitter for injection locking of a new pulse. Meanwhile, a part of the new transmitted pulse is coupled off into the optical delay line in the same manner as has been described.

A high Q oscillator 37 serially interconnected with the B output of switch 31 in the transmit line prevents the buildup of feedback noise in the transmitted pulse, and, in this way, cleans up phase noise which may be present in the signal As already indicated, the amplifier 34 suppresses amplitude noise, and also the limiter in the fiber optic receiver 30 aids this same purpose.

Figure 6:
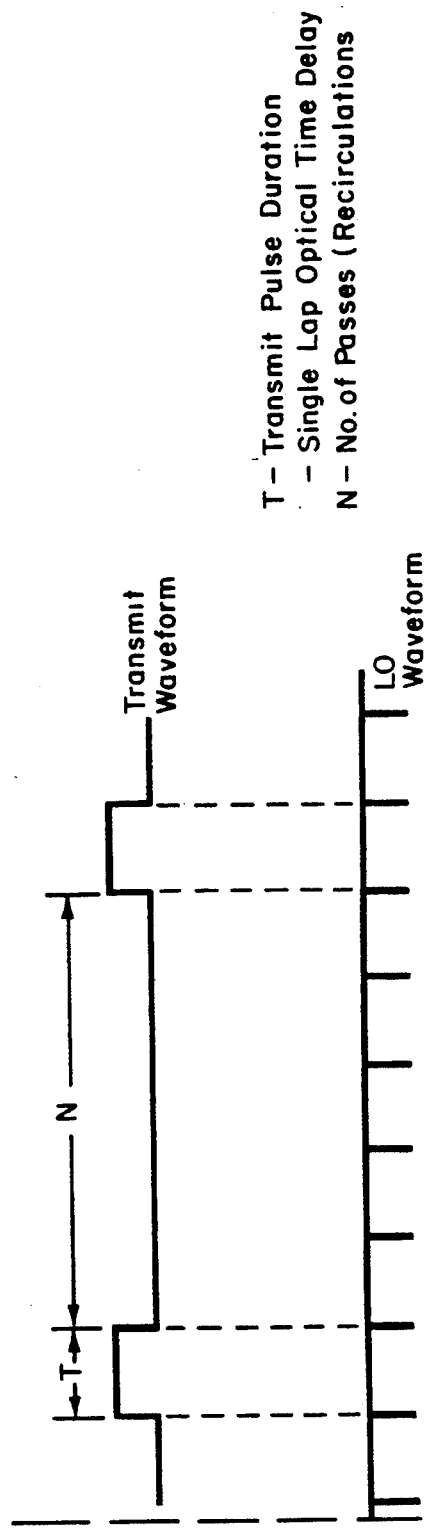
FIG. 6 is a timing graph of certain signal waveforms in the circuit of FIG. 5.

FIG. 6 shows in graphical form the local oscillator waveform available at 35 and its time relation to the radar transmitted pulses.

In recapitulation, the described coherent-on-receive radar provides an LO signal to the receiver that consists of delayed replicas of the transmit pulse. Pulse-to-pulse coherency in the transmitter is achieved by locking each transmit pulse to the preceding transmit pulse delayed in time.

The described radar system is particularly advantageous in not requiring a stable continuous wave oscillator which is a relatively expensive item. Magnetrons and IMPATT (silicon or gallium arsenide semiconductors) oscillators, although sufficiently modestly priced, are not used in conventional radar systems as a stable frequency source because both have a short coherence interval (i.e., time during which the reference oscillator is coherent). However, in the present invention either of these oscillators can be used (i.e., oscillator 37) in the pulse mode to provide both the reference frequency as well as the high power transmit pulses.

Figure 7:
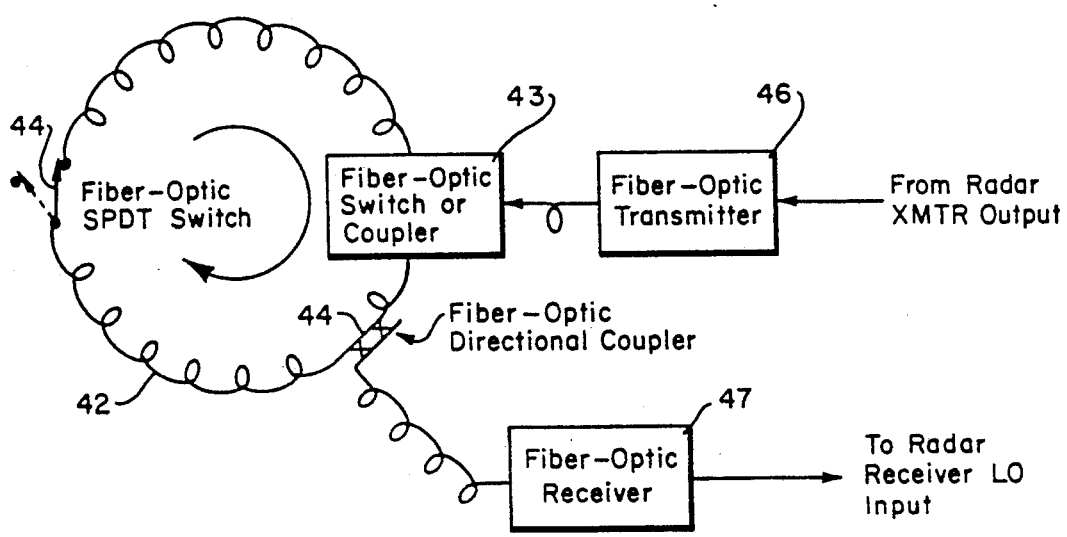
FIG. 7 is an alternative embodiment employing purely optical recirculating delay line.

Reference is now made to FIG. 7 showing a circuit schematic of a further embodiment primarily differing from the previously described embodiment in utilizing a purely optical delay line. An advantage of this pure optical delay is that since the delayed transmit pulse is not converted from a microwave signal to an optical signal, and then back again, this eliminates noise buildup associated with the microwave components inside the delay loop. As before, the basic optical fiber delay line includes a length of optical fiber 42 which is precisely cut to provide a delay corresponding to the length of a transmitted radar pulse. Optical switch 44 has A and B connective aspects. A portion of the transmitted signal is coupled from the transmitter and converted in a fiber-optic transmitter 46 into an optical signal, which switch/coupler inserts into the optical delay line. The opposite end, or switch 44 end, of the delay line when the switch is set to B, feeds the delayed optical signal to a fiber-optic receiver and limiter 47 for conversion to a microwave signal.

It is highly desirable in an air-to-ground missile to be able to function a radar system at millimeter wave frequencies (MMW) which provides the seeker with the ability to resolve rather small targets such as a tank with a relatively small diameter antenna. The essential modification from the FIGS. 5 and 7 version for this purpose would be to use the coupled radar pulse to actuate a laser beam, the optical output of which is then treated by a modulator to produce the desired pulse optical signal for insertion into the delay line. Otherwise, the system would operate in the same manner and include the same components as shown in FIGS. 5 and 7 and, therefore, will not be described in detail. In explanation of operation, there is a fundamental limitation on the maximum direct modulation that may be applied to a laser in view of the laser relaxation resonance. Accordingly, direct amplitude modulation of the laser beam must at the present time be relied upon.

A number of optical modulators provide a satisfactory external modulator for a laser beam, such as Mach-Zehnder interferometric and directional coupler modulators in Ti·LinbO$_3$ and GaAs, and electro-absorption modulators in GaAs.

Although the different embodiments of the invention have been described using an optical fiber delay line, it is contemplated that other delay media can be employed with advantage, such as, for example, coaxial delay lines and SAW delay devices.

Review of the coherent radar system described herein establishes not only that it has the ability to utilize less expensive oscillatory power sources (e.g., magnetron, IMPATT oscillator), but also shows a greater degree of noise correlation in the receiver.

The following are commercially available items for certain of the more unusual radar system components described herein:
1. Fiber-optic transmitter 29—TSL-1000, Ortel Corporation;
2. Fiber-optic receiver 30—RSL-25, Ortel Corporation;
3. Coupler 50—2020-6621-IO, Omni-Spectra;
4. External laser beam modulator—MZ313P, Crystal Technology.

The remaining system components are all deemed well-known to those skilled in the appertaining art.

Although the invention has been described in certain preferred embodiments, it is to be understood that one skilled in appertaining art could effect further modifications without departing from the spirit of the invention.

What is claimed is:

1. In a radar system having a high-frequency transmit pulse generator, an antenna for radiating transmit pulses toward a target, means for receiving reflected transmit pulses, and means for processing the received pulses, the improvement comprising:
   means for coupling a portion of a transmit pulse;
   means for converting the coupled transmit pulse portion to a corresponding optical signal;
   means for delaying the optical signal a period of time equal to that of a transmit pulse duration;
   means for converting the delayed optical signal to a high-frequency pulse to provide a delayed replica of the transmit pulse in said radar system, and
   means for injecting said delayed replica transmit pulse into said transmit pulse generator to provide phase coherency between transmitted pulses.

2. A radar system as in claim 1, in which the delay line provides a delay equal to the duration of a transmit pulse.

3. In a radar system including a transmitter for generating successive first and second output pulses of predetermined duration along a transmission path, an antenna for radiating the transmitter output pulses toward a target for reflection therefrom as radar echo/return pulses, a duplexer for separating the transmitter output pulses and the radar echo/return pulses, an improvement comprising:

first means for coupling a portion of a first transmitter output pulse from the transmission path;

delay means for delaying said coupled portion of said first transmitter output pulse for a delay period equal to said predetermined duration;

second means for coupling a first portion of said coupled portion of said first transmitter output pulse to the receiver for phase comparison with a first radar return/echo signal;

third means for coupling a second portion of said coupled portion of said first transmitter output pulse in the transmitter for injection locking with a second transmitter output pulse, thereby achieving phase coherency between said first and said second transmitter output pulses.

4. A radar system as in claim 3, wherein said first, second and third means each comprises a directional coupler.

5. A radar system as in claim 3, wherein said delay means comprises a delay medium having an input and an output and means interconnected with the delay medium input and output and selectively actuable to form a recirculating circuit.

6. A radar system as in claim 5, wherein said recirculating circuit with delay medium provides a one cycle delay time around a loop equal to the duration of said first transmitter output pulse.

7. A radar system as in claim 5, wherein said delay medium is an optical fiber.

8. A radar system as in claim 5, wherein said delay medium is a surface acoustic wave (SAW) delay line.

* * * * *